UNITED STATES PATENT OFFICE.

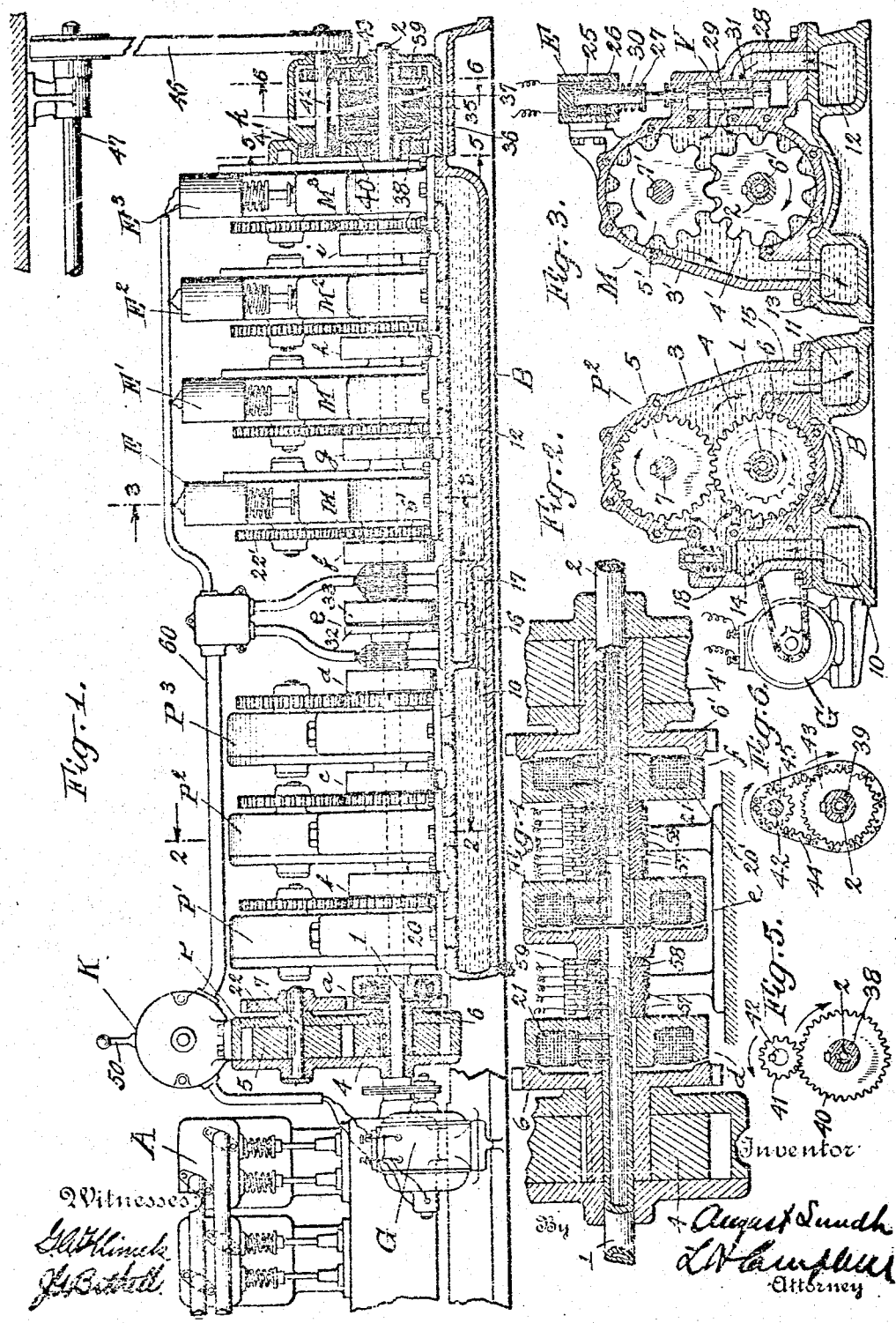

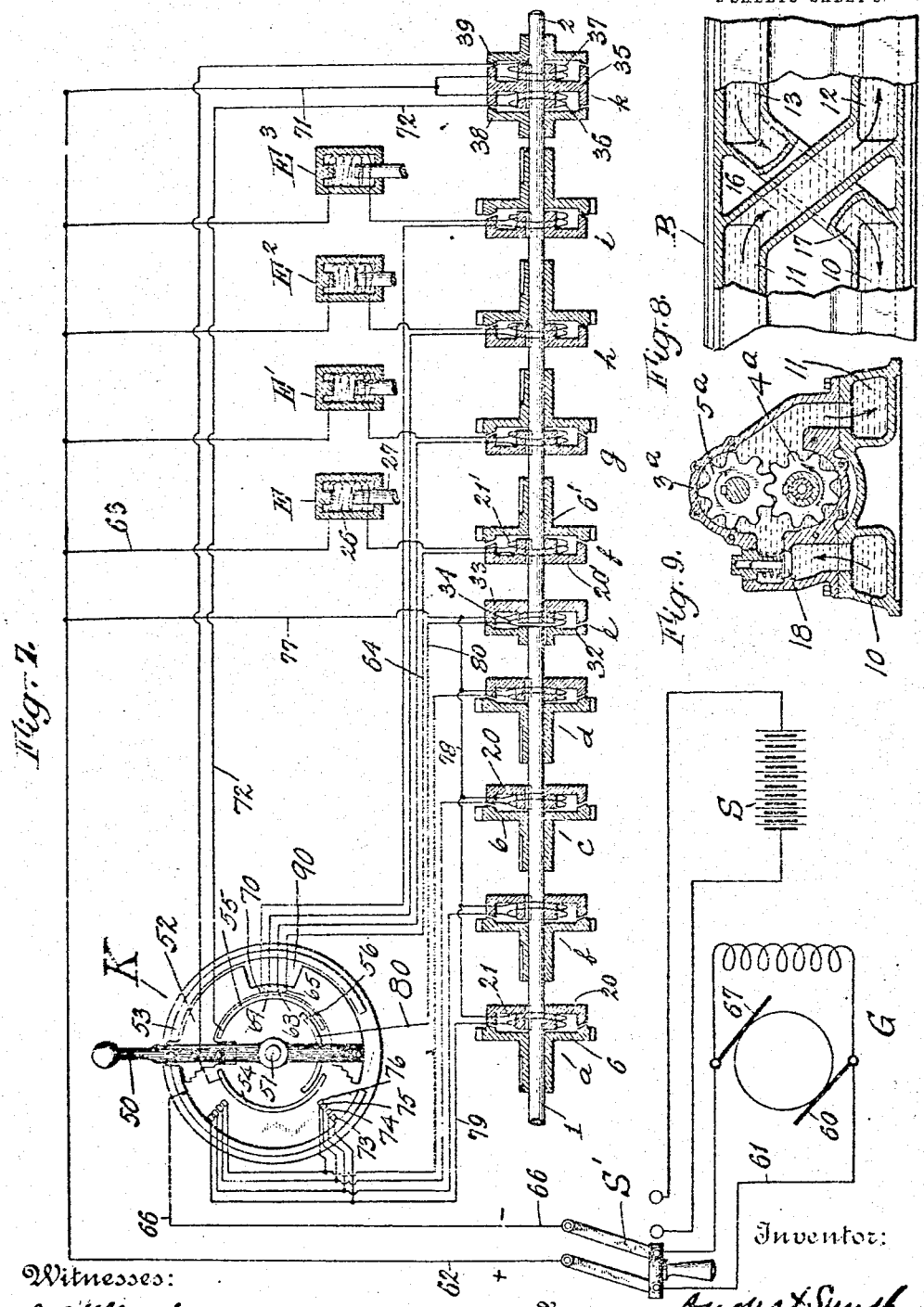

AUGUST SUNDH, OF YONKERS, NEW YORK.

ELECTROHYDRAULIC SPEED-GOVERNING DEVICE FOR POWER TRANSMISSION.

1,011,269.

Specification of Letters Patent. Patented Dec. 12, 1911.

Application filed September 16, 1909. Serial No. 517,961.

*To all whom it may concern:*

Be it known that I, AUGUST SUNDH, a citizen of the United States, residing at Yonkers, in the county of Westchester and State of New York, have invented a new and useful Improvement in Electrohydraulic Speed-Governing Devices for Power-Transmission, of which the following is a specification.

The present invention relates to mechanism for transmitting power by means of a fluid pressure and in which a plurality of pumps and a plurality of motors, adapted to be operated by fluid pressure supplied from the pumps, are interposed between a prime mover, or other suitable source of power, and the mechanism to be driven.

The invention also comprises electro-magnetic clutch mechanism and valve mechanism for varying the operative relation of the pumps and motors whereby the speed and torque of the driven mechanism may be varied as desired.

The exact nature of the invention and the objects sought to be attained will appear more fully hereinafter.

Referring to the accompanying drawings, Figure 1 is a part sectional elevation view of a construction embodying the principles of my invention. Fig. 2 is a sectional elevation view of one of the pumps as indicated by the section line 2—2 of Fig. 1. Fig. 3 is a similar view of one of the motors as indicated by the line 3—3 of Fig. 1. Fig. 4 is a sectional elevation on an enlarged scale showing some of the electro-magnetic clutches. Figs. 5 and 6 are detailed views of gearing between the reversing clutch and the driven mechanism as indicated by the lines 5—5 and 6—6, respectively, of Fig. 1. Fig. 7 is a diagrammatic view of the electrical controlling devices and system of circuits. Fig. 8 is a fragmentary view showing the connecting passages between the pumps and motors. Fig. 9 is a sectional view of a modified form of pump.

The general arrangement of the mechanism as herein shown comprises a prime mover A having a drive shaft 1, and the plurality of pumps P, P', P², and P³ adapted to be connected to the drive shaft by means of electro-magnets $a$, $b$, $c$ and $d$. A plurality of motors, M, M', M² and M³, operable by means of fluid pressure supplied by the pumps, are adapted to be connected to a driven shaft 2 in alinement with drive shaft 1 by means of electro-magnetic clutches $f$, $g$, $h$ and $i$. A reversing clutch $k$ controls the direction of motion transmitted from the shaft 2 to the mechanism to be driven. Electric current, for energizing the clutch magnets and valve magnets controlling the motors, is supplied from a storage battery S, a generator G, or any other suitable source of current supply. The power to be transmitted may be supplied from any suitable engine, motor, or other source of supply depending largely upon the particular use to which the transmission mechanism is to be put. As shown, a gas engine A, adapted to run continuously in one direction and at a substantially constant speed, is employed.

The pumps P, P', P², and P³ as shown, are substantially alike in construction so that a description of one will suffice for all. The pump P² for example, comprises a casing 3 containing intermeshing pump gears 4 and 5. The gear 4 is keyed to the hub of a clutch member 6, the latter being loosely mounted on the shaft 1 of the engine A. The gear 5 is keyed to a stud shaft 7, journaled in the pump casing 3. The pumps and the motors are mounted on a base B which may be made of a single casting and comprises a plurality of channels or chambers 10, 11, 12 and 13. The supply chamber 10 connects with the intake sides of the pumps through passages 14 and the pressure side of the pump is in connection with the pressure chamber 11 through passages 15. The pressure chamber 11 is connected through a diagonal passage 16 with the pressure chamber 12 for the motors. The latter exhaust into the exhaust chamber 13 which is connected through the passage 17 with the supply chamber 10. Each pump is provided with a check valve 18 which permits a free flow of liquid from the supply chamber 10 to the pump but prevents a flow of liquid through the pump in the reverse direction.

Each of the clutches, $a$, $b$, $c$ and $d$ comprises a clutch member 6 loose on the drive shaft and a member 20 keyed to the drive shaft. These members are made of magnetic material and the member 20 contains a magnet coil 21. One of the clutch members, preferably the member 6, is adapted to have a slight movement longitudinally of the drive shaft so that it may be brought into and out of contact with the clutch member 20. The clutch member 6 is formed with gear teeth meshing with gear teeth formed on a gear wheel 22 keyed to the stud shaft 7.

The motors M, M', M² and M³ are similar in construction to the pumps, and as shown, each comprises the casing 3' containing pump gears 4' and 5'. The gear 4' is keyed to the hub of a clutch member 6' loosely mounted on the driven shaft 2. The gear 5' is keyed to a stud shaft 7' to which is also secured the gear 22', meshing with gear teeth formed on the clutch member 6'. The clutches $f$, $g$, $h$ and $i$ each comprises a member 6' loose on the shaft 2, a member 20' keyed to the shaft and a magnet coil 21' carried by the member 20'.

Electro-magnets E, E', E² and E³ associated with the motors M, M', M² and M³ respectively, are adapted to operate valves V, controlling the circulation of liquid through the motors. As shown in Fig. 3, the magnet E comprises a casing 25 secured to the pump casing and containing a magnet coil 26. The core 27 of the magnet is connected with the stem of the valve V. The latter is held in its raised position when the electro-magnet is energized and permits a flow of liquid from the supply chamber 12 through a passage 28 and a port 29 to the pressure side of the motor gears. When the magnet E is deënergized, a spring 30, together with the weight of the magnet core and valve moves the latter downward into position to close the port 29 and cut off the supply of liquid to the motor. The valve V is preferably provided with an opening 31, extending longitudinally through the valve to equalize the pressure at opposite ends of the valve. It will be seen that the valve is balanced so that but little power is required to operate the same.

The clutch $e$ comprises clutch members 32 and 33 keyed to the shafts 1 and 2 respectively and the member 33 is provided with a magnet coil 34 adapted when energized to connect the clutch members and thereby connect the shafts 1 and 2 so that the shaft 2 is rotated independently of the fluid transmission mechanism, as fully set forth hereinafter.

The reversing clutch $k$ comprises an inner clutch member 35 keyed to the shaft 2 and carrying magnetic coils 36 and 37. The outer clutch members 38 and 39 loosely mounted on shaft 2 are adapted to be connected to the member 35 when the magnetic coils 36 and 37 respectively, are energized. Keyed to clutch member 38 (see Fig. 5) is a gear wheel 40 meshing with a pinion 41, keyed to a shaft 42. Secured to the clutch member 39 is a gear wheel 43 connected by means of a sprocket chain 44 with a sprocket pinion 45 also keyed to the shaft 42. The latter is connected through a belt 46 and counter-shaft 47 or other suitable gearing to the mechanism to be driven. It will be observed that when the reversing clutch member 39 is rotated, the sprocket chain connection will effect a rotation of the shaft 42 in the same direction, but when the clutch member 38 is rotated, the gears 40 and 41 will serve to rotate the shaft 42 in the reverse direction. The direction in which the shaft 47 is rotated will therefore depend on which of the reversing clutch coils is energized.

The power transmitting fluid employed may be either water, oil or some other liquid: a light oil, however, is usually preferred as it serves to keep the mechanism well lubricated, does not evaporate, does not freeze in cold weather and is a good electrical insulator.

The source of current supplied for the various electro-magnets will depend largely upon local conditions and the uses to which the invention is to be put. I have herein shown a storage battery S which may be connected through a double pole switch S' to the magnet circuits. A shunt wound generator G is also shown. This generator may be mounted on the base B and geared to the shaft 1 of the engine A so that substantially constant potential will be maintained at the brushes while the gas engine is operating.

The operation of the various electro-magnets is controlled by means of a manual controller K. This controller comprises a lever position 50 made of insulating material rotatable about a pivot 51. The lever 50 carries an arc-shaped contact strip 52 adapted to engage a series of stationary contacts. The upper end of the contact strip 52, where it is connected to the lever 50, is extended into position to maintain a constant sliding connection with a stationary contact strip 53. The end portion of the contact strip 52 is also adapted to be brought into engagement with contact strips 54, 55 and 56.

The shafts 1 and 2 as shown in Fig. 4 are hollow and contain the conductors leading from the terminals of the various clutch magnet coils. These conductors are connected to collector rings 57 mounted on bushes 58, secured to the shafts 1 and 2. Brushes 59 bear against these collector rings and are connected to the conductors leading to the controller K. These conductors are preferably inclosed in conduits 60.

The operation of my invention will be understood from the following description: Assuming the various parts to be in the positions shown, and that the prime mover A is running at a substantially constant speed, the drive shaft 1 will rotate independently of the pumps, the latter, together with the motors, being at rest. The generator G at this time supplies current to the electro-magnets E, E', E² E³ and the clutches $f$, $g$, $h$, and $i$. The circuit through the magnet E and clutch f may be traced as follows: from the positive brush 60 to conductor 61, switch S', positive conductor 62, conductor 63, coil of magnet E, coil 21' of clutch magnet f, conductor 64, contacts 65, 52 and 53 to the negative conductor 66 and from thence to the other brush 67. The circuits for the electro-magnets E', E² and E³ and the clutches g, h and i, may in like manner be traced from the positive wire 62 by way of the stationary controller contacts 68, 69 and 70 to the negative wire 66. The valve magnets, being energized, will hold the valves V in their open position as shown in Fig. 3, and the motor clutches f, g, h and i being energized, the motors will be connected to the driven shaft 2. If the controller lever 50 be now moved to the right for example, the contact 52 will first engage the contact strip 55 and thereby establish a circuit through magnet coil 36 of the reversing clutch k. This circuit may be traced from the positive conductor 62 through conductor 71, magnet coil 36, conductor 72, contacts 55, 52 and 53 to the negative conductor 66. The coil 36 will therefore receive current and the clutch members 35 and 36 will be connected so that any rotation of the shaft 2 will be transmitted through the gears 40 and 41 to the shaft 42 and from thence to the driven mechanism. A continued movement of the controller lever will next engage the lower end of the contact strip 52 with a stationary contact 73. This closes a circuit through the winding of the pump clutch a, which circuit may be traced from the positive conductor 62 through conductors 77 and 78, coil 21 of clutch a, conductor 79, contacts 73, 52 and 53 to the negative conductor 66. The clutch a being operated connects the pump gear 4 for rotation with the drive shaft 1. The upper pump gear 5 is also positively rotated through the gears 6 and 22. The pump P is therefore driven from the prime mover, the pump gears rotating in the direction indicated by the arrows in Fig. 2: liquid is therefore drawn from the supply chamber 10 through the passage 14 into the pump casing and carried by the pump gears to the pressure side of the pump, and from thence the liquid is forced into the pressure chamber 11 and through the passage 16 to the supply chamber 12 for the motors. From the chamber 12 the liquid is forced through the four motors M, M', M² and M³, in parallel driving said motors and thereby rotating the driven shaft 2. The liquid from the exhaust side of the motors passes into the chamber 13 and from thence through the channel 17 to the supply chamber 10, thereby completing the circulation of the liquid. The motion of the shaft 2 is transmitted to the driven mechanism as before noted. As the liquid from the pump P is divided between the four motors, the speed of the latter will be correspondingly slow. It will be further observed that the gear teeth on the motor gears are much larger than those on the pump gears so that the speed of each motor will be much less than that of a pump with a given volume of liquid circulating therethrough. The pumps and motors are so proportioned that it requires about four times as much liquid circulating through a motor to maintain a given speed as is circulated through a pump when the latter is driven at said speed. It will thus be seen that when the pump P is operating alone, the speed of the shaft 2 will be about 1/16 that of the drive shaft. As the movement of the controller lever is continued, the contact strip 52 next engages the stationary contact 74 and closes a circuit through the magnet winding of the clutch b so that the latter is operated to connect the pump P' to the drive shaft. The pumps P and P' will now operate together and increase the volume of liquid circulated through the motors, thereby increasing the speed of the driven mechanism. As the movement of the controller lever is continued, the contact 52 successively engages the contacts 75 and 76, thereby operating the clutches c and d, connecting the pumps P² and P³ to the drive shaft and effecting a corresponding increase in the speed of the driven mechanism. A further rotation of the controller lever moves the contact 52 off from the stationary contact 70 and opens the circuit through the windings of the valve magnet E³ and the motor clutch i. The clutch i being deënergized disconnects the motor E³ from the driven shaft 2. The valve V of the motor M³ is at the same time dropped and closes the port 29 of said motor, thereby cutting off the circulation of liquid through the motor. The liquid from the pumps is now forced to circulate through the three motors M, M' and M² which results in a corresponding increase in the speed of the driven shaft. The continued movement of the controller lever in like manner opens the circuits for the magnets E² and E' and the clutch magnets h and g at the contacts 69 and 68, thereby disconnecting the motors M² and M' from the driven shaft with a corresponding increase of the speed of the driven mechanism. The four pumps are now operating in parallel to force the liquid through the motor M and as the capacity of the latter is substantially equal to that of the four pumps, the speed of the shaft 2 will be substantially that of the drive shaft 1. The continued movement of the controller lever 50 brings the contact 52 into engagement with the stationary contact 56, thereby completing a circuit through the winding 34 of the clutch e. This circuit is by way of conductors 62 and 77, clutch coil 34, conductor 80, contacts 56, 52 and 53, and conductor 66. The clutch e is therefore operated to connect the shafts 1 and 2 independently of the fluid transmission mechanism. At substantially the same time or directly after the clutch e is operated, the controller contact 52 moves off from the contacts 73, 74, 75 and 76 simultaneously, these contacts being now in a recess 90, formed in the contact strip 52. The pump clutches a, b, c and d will therefore be opened and release the pumps from the drive shaft. At the same time or directly after the pumps are thus disconnected from the drive shaft, the contact 52 moves off the contact 65, thus opening the circuit through the magnet E and clutch f for the motor M. The latter is therefore disconnected from the driven shaft and its valve V closed, thereby cutting off all circulation of the liquid through the motors. The pumps and the motors are therefore all brought to rest and the power is transmitted directly from the drive shaft through the clutch e to the shaft 2 and from thence through the reversing clutch to the driven mechanism. By moving the controller lever back toward its initial position, the pumps and the motors will again be brought into operation and the speed of the driven mechanism gradually reduced, the various clutches being operated in the reverse order to that above described for a forward movement of the controller lever. If the lever 50 is moved to the left from its initial position, the contact 52 will first engage the contact strip 54 and complete a circuit through the winding 37 of the reversing clutch. The latter will therefore connect the clutch member 39 to the shaft 2; when the latter is operated the power will be transmitted through the sprocket chain 44 and pinion 45 and shaft 42. The continued movement of the controller lever to the left will effect operation of the remaining clutches and the valve magnets in the same order as when the controller lever is moved to the right so that the speed of the driven mechanism will again be gradually accelerated.

Fig. 9 shows a modification of one of the pumps. The gears 4ᵃ and 5ᵃ are in this instance smaller but the gear teeth larger than those shown in Fig. 2. The size of the pump casing is also correspondingly reduced. The capacity of this pump preferably bears the same relation to that of the motors as described in connection with that shown in Fig. 2.

I wish not to be limited to the particular constructions herein described as various changes in the details of construction and arrangement of parts might be made by those skilled in the art without departing from the spirit and scope of the invention.

What I claim as new and desire to secure by Letters Patent of the United States, is:—

1. The combination with a plurality of pumps, of a plurality of motors operable by fluid pressure supplied from the pumps, a driving member, means for successively connecting the pumps to said member, and means for cutting off the circulation of liquid through said motors in succession.

2. The combination with a plurality of pumps, of a plurality of motors, a driving member, means for successively connecting the pumps to the driving member, means for circulating the liquid from the pumps through the motors in parallel and means for cutting off the circulation of the liquid through the motors in succession.

3. The combination with a plurality of pumps, of a series of motors, a driving member, means for connecting the pumps to the driving member in succession, passages for circulating liquid from the pumps through the motors, a driven member to which the motors are initially connected, means for successively disconnecting the motors from the driven member after the pumps have been connected to the driving member, and means for cutting off the circulation of liquid through the motors as they are disconnected from the driven member.

4. The combination with a drive shaft and the driven shaft, of a plurality of pumps initially disconnected from the drive shaft and a plurality of motors initially connected to the driven shaft, means for connecting the pumps to the drive shaft in succession, means for circulating liquid from the pumps through the motors in parallel as the pumps are operated, means for successively disconnecting the motors from the driven shaft, and means for cutting off the circulation of liquid through said motors as they are disconnected.

5. The combination with a series of pumps, of a series of motors, a supply chamber communicating with the intake sides of the pumps, a pressure chamber having communication with the pressure sides of the pumps and motors, an exhaust chamber for the motors in communication with said supply chamber for the pumps, a driving member, means for successively connecting the pumps to the driving member for operation and thereby circulating a liquid through the motors in parallel to operate the latter, and means for cutting off the circulation of liquid through the motors in succession.

6. The combination with a drive shaft, of a plurality of pumps, clutches between said shaft and pumps, means for operating the clutches in succession and connecting the pumps with the said shaft, a driven shaft, a plurality of motors, clutches initially connecting the pumps with the driven shaft, passages for a circulation of a fluid through the pumps and motors, and means to operate said last named clutches in succession, to disconnect the motors from the driven shaft after the pumps have been connected to the drive shaft.

7. The combination with a driving member and a driven member, of a plurality of motors operatably connected to the driven member, a plurality of pumps, controlling mechanism operable to connect the pumps in succession to the driving member and then to successively disconnect a number of said motors from the driven member in succession, means for conveying liquid from the pumps to the motors and from the latter back to the pumps, and a device for connecting said members for operation independently of the pumps and the motors.

8. The combination with a drive shaft and a driven shaft in alinement, a series of pumps, a series of motors operable by fluid supplied from the pumps, means for successively connecting the pumps to the drive shaft and thereby operating the motors at a gradually increasing speed, devices initially connecting the motors to the driven shaft, means for successively operating said devices to disconnect the motors from the driven shaft, means for preventing the circulation of liquid through the motors that are disconnected from the driven shaft, a clutch between said shafts and means for operating the clutch to connect the shafts independently of the pumps and motors when said shafts are rotating at a predetermined relative speed.

9. The combination of a drive shaft and a driven shaft in alinement, a plurality of pumps, clutches between the pumps and the drive shaft, a plurality of motors, clutches between the motors and the driven shaft a clutch between said shafts, and means for successively operating the clutches between the pumps and drive shaft and then successively operating the clutches between the motors and driven shaft and finally operating the clutch between said shafts.

10. The combination with a driven member, of a plurality of motors operable by liquid under pressure, a clutch between each motor and said driven member, a valve connected with each motor and movable into and out of position to cut off the circulation of liquid through the motor, means for supplying liquid under pressure to operate the motors, devices for successively operating said clutches, and means for operating each valve substantially simultaneously with the operation of the corresponding clutch.

11. The combination with a plurality of liquid motors, of means for circulating liquid under pressure through the motors to operate the same, a driven member, clutches connecting the motors with the driven member, valves associated with the motors and movable into position to cut off the circulation of liquid through the motors, means for operating the clutches in succession to disconnect the motors, and means for operating the valves to check the circulation of liquid through each motor as it is disconnected from said shaft.

12. The combination with a liquid motor, of a driven member, a clutch between the motor and said member, means for supplying liquid under pressure to the motor, a valve, means for operating the clutch to disconnect the motor from said driven member and means coöperating with the clutch operating means for operating the valve into position to check the circulation of liquid through the motor whenever the latter is disconnected from the driven member.

13. The combination with a driving member and a driven member in alinement, of a plurality of pumps, a plurality of motors operable by fluid supplied from the pumps, each of said motors having a capacity substantially equal to the capacity of the pumps combined, clutches normally connecting the motors to the driven member, clutches between the pumps and the driving member, means for operating said last named clutches in succession and thereby gradually accelerating the motors, means for successively operating the first named clutches to disconnect all of said motors but one from the driven member and thereby accelerate the driven member to substantially the same speed as the driving member, a clutch between said members, means for operating said clutch when said members have been brought to substantially the same speed, and means for disconnecting all of the pumps and motors from said members when the latter are directly connected through the clutch.

14. The combination with a driving member and a driven member, of a plurality of pumps initially disconnected from the driving member, a plurality of motors initially connected to the driven member and each having a capacity substantially equal to the combined capacities of the pumps, means for connecting the pumps to the driving member in succession, means for then disconnecting all but one of said motors from the driven member in succession, means for then connecting said members for operation independently of the pumps and the motors, and means for then disconnecting the last motor from the driven member and also disconnecting the pumps from the driving member.

15. The combination with a drive shaft and a driven shaft, of a plurality of pumps, pump clutches between the pumps and drive shaft, a plurality of motors, motor clutches between said motors and the driven shaft, means for supplying current to the windings of said clutches and means for successively operating the pump clutches to connect the pumps to the drive shaft and then successively operating the motor clutches to disconnect the motors from the driven shaft.

16. The combination of a drive shaft and a driven shaft in alinement, a plurality of pumps, a plurality of motors, electromagnetic clutches between the pumps and drive shaft, electro-magnetic clutches between the motors and the driven shaft, an electro-magnetic clutch between said shafts, means for supplying current through the windings of the said clutches, and a controller for the circuits of said windings and operable to successively connect the pumps to the drive shaft and then successively disconnect the motors from the driven shaft, connect said shafts through the clutch between said shafts and then disconnect the pumps from the drive shaft.

17. The combination with a driven member, of a plurality of fluid motors, means for supplying fluid under pressure to operate said motors, an electro-magnetic clutch between each motor and said member, valve mechanism associated with each motor and controlling the circulation of fluid therethrough, electro-magnets controlling the operation of said valve mechanism, said magnets having their windings in circuit with magnet windings of the corresponding clutches, and a controlling device for effecting the successive operation of the clutches and valve magnets.

18. The combination with a drive shaft and a driven shaft in alinement, of a clutch between said shafts, a plurality of pumps initially disconnected from the drive shaft, electro-magnetic clutches between the pumps and drive shaft, a plurality of motors, electro-magnetic clutches initially connecting the motors with the driven shaft, electromagnets having their windings respectively in series with the magnet windings of said last named clutches, valves operated by said magnets and controlling the circulation of liquid through the motors, and a controller operable to effect the operation of the clutches and valve magnets in a predetermined order.

19. The combination with a drive shaft and a driven shaft, of a plurality of pumps, electro-magnetic clutches between the pumps and drive shaft, a plurality of motors operable by fluid supplied from the pumps, electro-magnetic clutches between the motors and driven shaft, driven mechanism, electro-magnetic reversing clutches between the driven shaft and driven mechanism, a source of current supply, and a controller between said source of supply and the magnet windings of the clutches and operable to effect the operation of the clutches in a predetermined order.

In testimony whereof, I have signed my name to this specification in the presence of two subscribing witnesses.

AUGUST SUNDH

Witnesses:
 JAMES G. BETHELL,
 JOHN F. RULE.